Patented Aug. 18, 1953

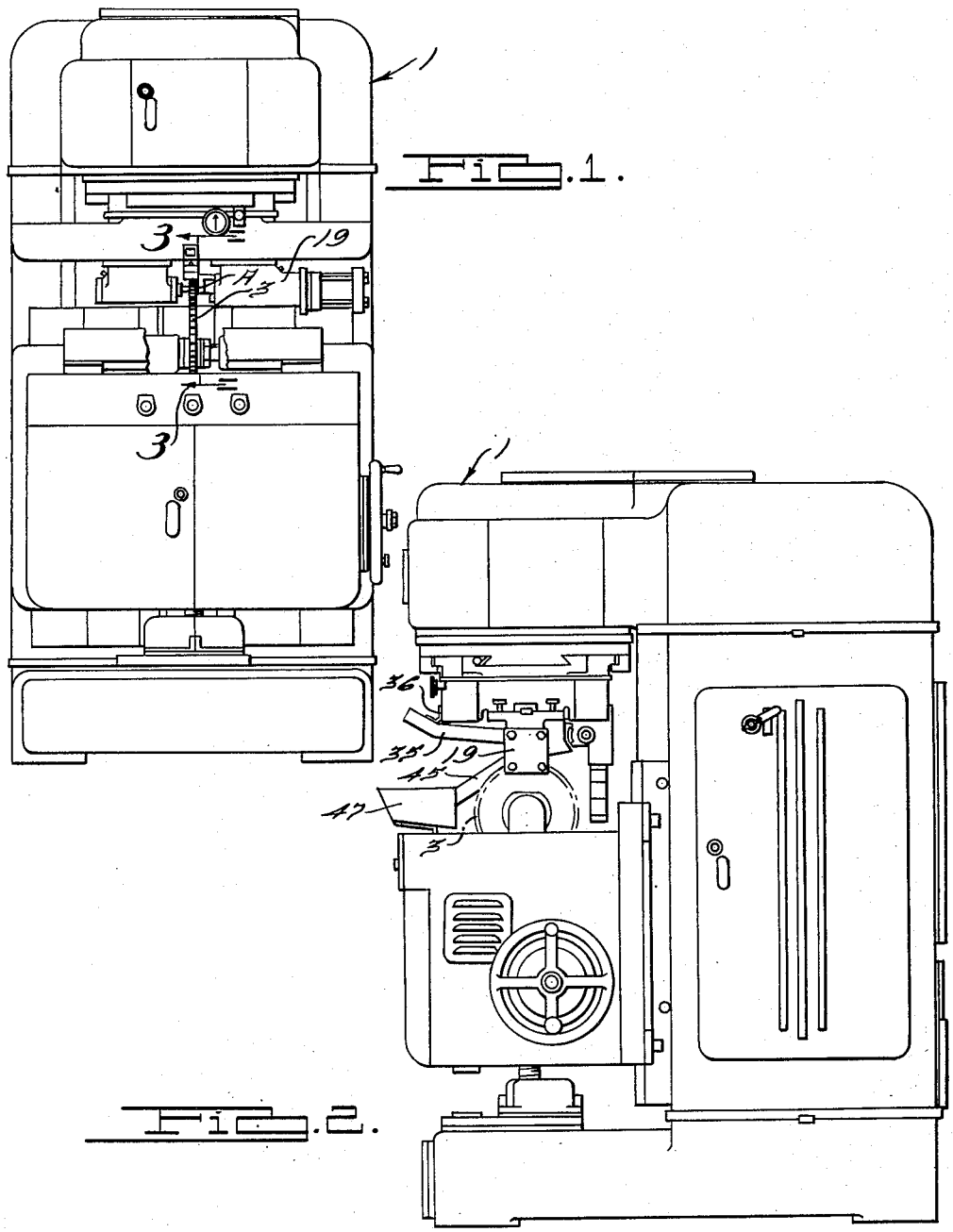

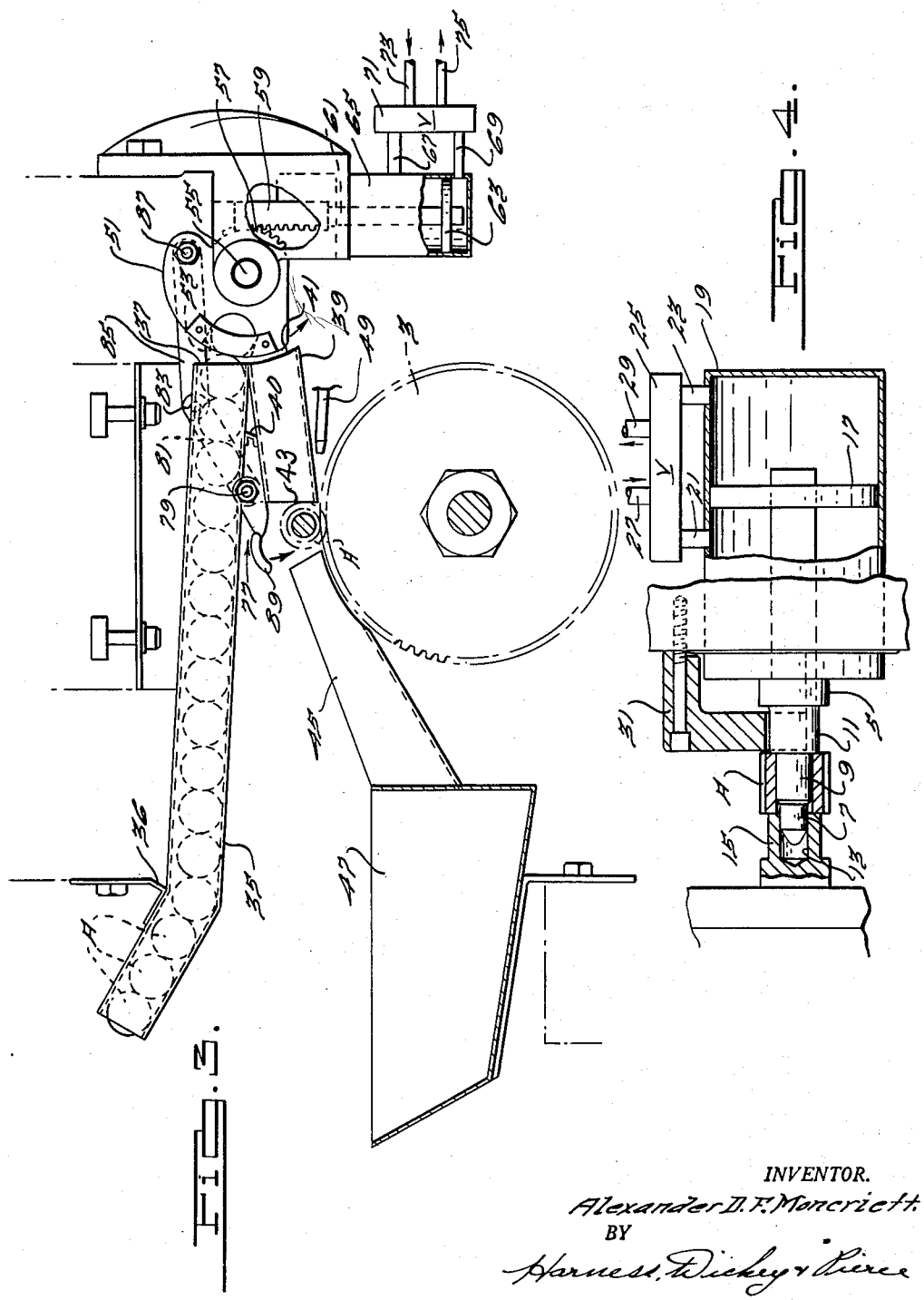

2,649,032

UNITED STATES PATENT OFFICE 2,649,032

DEVICE FOR GRAVITY FEED OF GEARS TO GEAR SHAVING TOOL

Alexander D. F. Moncrieff, Detroit, Mich., assignor to Michigan Tool Company, Detroit, Mich., a corporation of Delaware Application June 16, 1948, Serial No. 33,369

11 Claims. (Cl. 90—1.6)

This invention relates to feed mechanisms and especially to feed mechanisms capable of manual or automatic actuation.

An object of the invention is to provide a feed mechanism which is capable of holding a large number of articles and of intermittently delivering a predetermined number thereof to a place for treatment.

Another object is to provide a feed mechanism which is capable of both delivering and positioning articles for treatment.

Another object is to provide a feed mechanism which is capable of delivering and positioning articles for treatment and of removing articles after treatment.

In order to accomplish these objects, the invention preferably employs a pair of gravity feed chutes having adjacent openings. One chute comprises a feed hopper containing a large number of articles to be treated and the other a delivery chute terminating at the point of treatment. A novel article transfer member, which may be manually or automatically actuated by conventional means, delivers the required number of articles from the feed chute to the delivery chute. A positioning arm is linked to the transfer member in order to catch article sliding down the chute and position them in the proper location for treatment. Suitable means are provided for holding articles during treatment.

While the invention has many other applications, it is illustrated in connection with a gear shaving machine. In this application, a preferred embodiment has the delivery chute terminating so that the position of treatment or shaving is located slightly off-center of the cutter on the down-chute side. This places the gear being machined in an unstable position so that after treatment the force of gravity, preferably assisted by a suitably positioned jet of cutting fluid, automatically causes the gear to move downwardly away from the cutter into a suitable storage bin.

An embodiment of the invention as applied to a gear shaving machine is shown in the accompanying drawings, in which:

Figure 1 is a front elevation with parts broken away of a gear shaving machine having the improved feed mechanism associated therewith;

Figure 2 is a side elevation of the structure shown in Figure 1;

Figure 3 is an enlarged section taken along the line 3—3 of Figure 1 with parts removed; and Figure 4 is an enlarged view with parts removed and parts in section of a means for holding a gear during the shaving operation.

The gear-shaving machine 1, which is described in more detail in a copending application, Serial No. 6,488, entitled "Gear Shaving Machine," of A. Donald Moncrieff and James Martin, filed February 5, 1948, has a rotary cutter 3 for shaving the teeth of a gear A.

The gears A may be fixedly positioned and held during treatment or shaving by means of the structure best illustrated in Figure 4. This included a reciprocable rod 5 having a forward end 7 of slightly smaller diameter than the internal diameter of the gear A, a neck portion 9 rearwardly adjacent to the end 7 of substantially the internal diameter of the gear and of no greater length than the width of the gear hub, and a shoulder portion 11 adapted to abut the side of the gear. In operative position as shown in Figure 4, the gear is mounted on the neck 9 and the forward end 7 of the rod 5 is fitted into a bore 13 in a fixed block 15 which is of greater diameter than the internal diameter of the gear A. The gear A is therefore clamped between the end of the block 15 and the shoulder portion 11 of the rod 5 and in this position is capable of being shaved by the cutter 3.

The rod 5 is preferably pressure-actuated by means of a double-face piston 17 affixed thereto in the cylinder 19. Pressure fluid may be admitted to either side of the piston 17 by means of conduits 21 and 23. A suitable four-way valve 25 may be used to selectively connect these conduits to the pressure or exhaust lines 27 and 29 respectively. When the valve 25 is manually actuated to admit pressure through conduit 23, the piston 17 and rod 5 are forced to the left to the operative position shown wherein they are capable of holding a gear A during shaving. When pressure is admitted through conduit 21, the piston is forced to the right and the rod 5 is withdrawn from the gear A. The fixed overhanging arm 31 prevents movement of the gear A to the right on the rod 5. The gear is thus free to be removed from the treatment position and be replaced by another.

The novel mechanism for automatically aligning another gear with the rod or arbor 5 is best shown in Figure 3. This includes a downwardly inclined feed hopper or chute 35 which carries a multiplicity of gears A which rest on their peripheries. The chute 35 may be fixedly connected to the machine 1 as by a bracket 36. Due to the inclination of the chute 35, these gears are biased by gravity to roll downwardly toward the outlet 37 of the chute. A second downwardly inclined delivery chute 39, which may be affixed to the underside of chute 35 by a bracket 40, has an inlet opening 41 located preferably beneath the outlet opening 37. The chute 39 preferably terminates or has its outlet 43 at about the intersection of a vertical plane through the axis of the cutter 3 with the periphery of the cutter. Just beyond the outlet 43 is the position in which the gears are engaged by the rod 5 and shaved by the cutter 3. It will be recognized that the gears are unstable in this position since there is an unresisted gravitational component of force acting upon them. Hence when the rod 5 is withdrawn from the gears they roll downwardly into a third chute 45, which is suitably connected to the machine, and thence to a storage bin or tote box 47. In order to provide an additional force for driving a gear into the removal chute 45, the cutting fluid conduit 49 is positioned as shown in Figure 3 so that the cutting fluid strikes the opposite side of a gear and thus, in effect, washes it into the chute 45.

Means are provided for transferring a gear from the outlet 37 of the chute 35 into the inlet 41 of the chute 39. This preferably comprises a sector 51 having a recess or cavity 53 in a lower portion of its outer periphery which is adapted to accommodate a gear A. The sector 51 is pivoted to a suitable fixed part of the machine 1 as shown at 55. The pivot point 55 is positioned so that in the upper position shown in Figure 3 gears roll by gravity into the recess 53 and so that when the sector is moved downwardly the recess will align with the inlet 41 of the chute 39 to permit a gear carried therein to roll by gravity into this chute. The sector has a peripheral portion of reduced diameter which is provided with gear teeth as shown at 57. These are engaged by a rack 59 which is formed on the end of a rod 61. The rod 61 is preferably pressure-actuated and for that purpose has a double-face piston 63 affixed thereto which is disposed in a hydraulic cylinder 65. Pressure is admitted to either side of the piston 63 by means of the conduits 67 and 69. A suitable four-way valve 71 may be used to selectively connect these conduits with the pressure and exhaust lines 73 and 75 respectively. When the valve is manually actuated to admit pressure through conduit 67, the sector 51 is in the position shown in Figure 3 wherein the recess 53 receives a gear from the chute 35. When pressure is admitted to the underside of the piston 63 through conduit 69, the sector is rotated downwardly to deliver a gear to the inlet 41 of chute 39.

For the purpose of halting and positioning gears rolling down chute 39, a positioning arm 77 is disposed therein and rotatably connected to a transverse rotatable pin 79 which is mounted in a suitable bearing affixed to the machine 1. Connected to the pin 79 on a side of the chute 35 is a link 81 which is suitably secured to the pin 79 so as to be capable of pivotally moving it and which is pivotally connected at 83 to a second link 85 which is pivoted to the top of the sector 51 as shown at 87. Thus when the sector 51 is rotated downwardly, this linkage rotates pin 79 in a counterclockwise direction to lower the arcuate gear contacting portion 89 of the arm 77 into the path of a gear rolling down the chute 39. This portion 89 is so arranged that a gear engaged thereby is in position to be mounted upon the rod 5.

In operation, it will be first assumed that the feed chute 35 is loaded with gears A and a gear is mounted on the neck 9 of rod 5 and clamped by pressure on piston 17 between the shoulder portion 11 of the rod 5 and the block 15. In this stage of operation, the sector 51 is in the upper position of Figure 3 so that the recess 53 is in alignment with the outlet 37 of the feed chute 35. After the gear on the rod 5 has been shaved, automatic means such as shown in my copending application, Serial No. 52,388, filed October 1, 1948, or manual methods may be employed to actuate valve 25 to connect the conduit 23 to exhaust line 29 and conduit 21 to pressure line 27. This forces the rod 5 to the right while the gear A is held in transverse position by the overhanging arm 31. When the rod 5 is completely withdrawn from the bore of the gear A, the gear is forced by gravity and by cutting fluid from conduit 49 into the chute 45 and thence into the storage bin 47.

During or after this removal operation of the shaved gear, manual means may actuate the valve 71 to connect conduit 69 to the pressure line 73 and the conduit 67 to the exhaust line 75. This forces the piston 63 and rod 61 upwardly so that the rack 59, which engages gear section 57, rotates the sector 51 downwardly in a counterclockwise direction. The recess 53 carries a gear A which it has received by gravity through the outlet 37 of the feed chute 35, and when the sector 51 is rotated so that it is aligned with the inlet 41 of the chute 39, the gear rolls into this chute. The upper peripheral part of the sector 51 covers the outlet 37 to prevent gears A from rolling out of the chute 35. While this rotation of the sector 51 is taking place, the link 85 which is pivoted thereto at 87 is moved upwardly and drives with it the upper end of the link 81 to which it is pivotally connected at 83. This rotates the pin 79 in a counterclockwise direction and thus lowers the gear-contacting portion 89 of the positioning arm 77 into position near the end of the chute 39 and into the path of the gear just released thereinto by the sector recess 53. The gear A is therefore stopped by the arm 77 and positioned by the portion 89 just on the downward side of a vertical plane through the axis of the cutter 3. The valve 25 may then be manually actuated to drive the rod 5 forwardly through the bore of the gear A, and while or after this has taken place the valve 71 may be manually actuated to return the sector 51 to the upper position and lift the arm 77 from the gear being shaved.

It will be apparent to those skilled in the art that the invention is capable of many modifications and of various other applications than the particular embodiment for the specific application hereinbefore described. Automatic operation of the elements of my invention is illustrated in my copending application, Serial No. 52,388, filed October 1, 1948.

I claim:

1. A feed mechanism for articles to be treated comprising a first downwardly inclined chute having an outlet at the lower end, a second downwardly inclined chute having an inlet adjacent said outlet, a first pivoted arm having means at the periphery thereof for receiving an article from said outlet and releasing it into said inlet, means for pivotally moving said arm, a second pivoted arm located near the outlet of said second chute for positioning an article therein in proper location for treatment, and linkage connecting the first arm to the second arm whereby the second arm is actuated to position when the first arm is actuated to release an article into the second chute and the second arm is actuated to release an article when the first arm is actuated to receive an article from the first chute.

2. A feed mechanism for articles to be treated comprising a first chute having an article transfer opening at one end, a second chute having an article transfer opening adjacent said opening and having an outlet, a movable closure for one of said openings, means including said closure for intermittently transferring a predetermined number of articles from the first chute to the second chute through said openings, an article positioner near said outlet connected to the closure and actuated by movement thereof to block the path of articles leaving the second chute and by abutment hold them at the place of treatment, and means for holding the article during treatment.

3. In a device having a cutter for machining gear teeth the combination of a first downwardly inclined chute having an opening at its lower end, a second downwardly inclined chute having an opening adjacent the other opening, said chutes being disposed above the cutter, said second chute being constructed and arranged so that its lower end terminates near the downward side of a vertical plane through the axis of the cutter, a movable gear transfer member co-operable with said openings and capable of intermittently receiving a gear from the first chute and releasing it into the second chute, a positioning arm actuated by the member for receiving and positioning a gear near the outlet of the second chute at said lower end on the downward side of said vertical plane, and means for holding a gear during machining by the cutter.

4. In a device having a cutter for machining gear teeth the combination of a first downwardly inclined chute having an opening at its lower end, a second downwardly inclined chute having an opening adjacent the other opening, said chutes being disposed above the cutter, said second chute being constructed and arranged so that its lower end terminates near the downward side of a vertical plane through the axis of the cutter, a movable gear transfer member co-operable with said openings and capable of intermittently receiving a gear from the first chute and releasing it into the second chute, a positioning arm actuated by the member for receiving and positioning a gear in the second chute at said lower end on the downward side of said vertical plane, means for holding a gear during machining by the tool, and a conduit for cutting fluid arranged to direct fluid on the upward side of a gear being cut so as to impart forces thereto tending to move it away from the second chute.

5. A feed and article positioning mechanism comprising a first downwardly inclined chute having an article transfer opening at its lower end, a second downwardly inclined chute having an article-receiving opening adjacent and below said opening, a centrally pivoted member having a peripheral article-receiving recess adapted to co-operate in article-transfer relationship with the openings and means for receiving turning or pivoting forces, means for applying turning forces to said means to pivot said member, said chutes and member being constructed and arranged so that the force of gravity moves an article from the transfer opening into the recess and from the recess into the receiving opening upon alignment of the recess with the respective openings, said member including a closure portion capable of holding articles in the first chute when the recess is in alignment with the receiving opening, and a movable positioning arm having an article contacting portion disposed near a downward portion of the second chute, said arm being connected to and actuated by said member so that it receives and positions articles when the recess is in alignment with the receiving opening and it is moved to inoperative position when the recess is not in alignment with the receiving opening.

6. In a gravity loading device for delivering articles to a work position, the combination of an inclined chute for carrying articles to be treated having an outlet above the work position, means movable to operative and inoperative positions for holding an article in position to be treated, a member movable to operative and inoperative positions, said member in operative position engaging an article delivered to the means for treatment and holding the article in the work position so that the means may be moved to operative position to hold the article during treatment, intermittently operated means operative to deliver a predetermined number of articles from the outlet of said inclined chute to the work position, and means interconnecting the intermittent means and the member so that they are operative at the same time.

7. In a loading device for gear shaving machines or the like, the combination of a downwardly inclined gravity feed chute having its outlet above the place of treatment, first means operative to prevent gravity flow of articles from the chute, second means operative in combination with the force of gravity on the articles to deliver articles one at a time from the chute to the place of treatment, third means to position articles at the place of treatment, fourth means for holding articles during treatment, said third means comprising an arm pivoted above the place of treatment and movable into the path of an article delivered to the place of treatment, means simultaneously operating the first and second means and moving said arm into said path, and means operative during operation of the fourth means for moving the arm out of said path whereby upon completion of treatment the article may move away from said place of treatment.

8. In a loading device for gear shaving machines or the like, the combination of a downwardly inclined gravity feed chute having its outlet above the place of treatment, first means operative to prevent gravity flow of articles from the chute, second means operative in combination with the force of gravity on the articles to deliver articles one at a time from the chute to the place of treatment, third means to position articles at the place of treatment, fourth means operative for holding articles during treatment and movable to an inoperative position, said third means comprising an arm pivoted above the place of treatment and movable into the path of an article delivered to the place of treatment, means simultaneously operating the first and second means and moving said arm into said path, means operative during operation of the fourth means for moving the arm out of said path whereby upon completion of treatment the article may move away from said place of treatment, and a conduit for fluid arranged to direct a jet of fluid on an article held by the fourth means so as to force the article away from the second means and thereby eject articles upon the fourth means becoming inoperative.

9. In a gear shaving apparatus having a rotary cutter, the combination of gravity feed means having an outlet near the top of the cutter and arranged to deliver gears to the top of the cutter, workholding means for holding a gear to be shaved in a position on top of the cutter with the axis of the gear being shaved offset laterally from a vertical plane through the axis of the cutter whereby the gear being shaved is in inherently unstable position with respect to the force of gravity, and downwardly inclined removal chute means adjacent but below the top of the cutter arranged to receive gears that have been shaved.

10. In a gear shaving apparatus, the combination of an upright frame having a horizontal table surface thereon, a peripherally toothed rotary cutter mounted on the table having its axis of rotation substantially parallel to the surface thereof, a first downwardly inclined gear feed chute mounted on the frame extending downwardly from the side of the table beyond the axis of the cutter and above the periphery of the cutter, a second downwardly inclined gear feed chute below the first chute and having an inlet adjacent the innermost end of the first chute and extending backwardly toward said side of the machine and having an outlet position above the cutter, workholding means arranged to receive gears from the second chute and hold them during shaving, and gear transferring means for delivering a gear at a time from the first chute to the second chute.

11. In a machine having a rotary cutter with peripheral teeth for shaving the teeth of gears, the combination of means for feeding gears to be shaved one at a time to a predetermined position on top of said cutter whereby the gears rest on the top periphery of said cutter in said position and the teeth of the gears and cutter mesh with each other, said means including a positioner operatively engageable with a gear at said position on the top of the cutter to prevent it from rolling on the cutter away from said position, an axially movable arbor to pass through the bores of gears at said position and rotatably support them during the shaving operation, means mounting said arbor for axial movement into and out of the bore of a gear at said position, means mounting said positioner for movement into and out of its position of operative engagement with a gear whereby upon retraction of said arbor from the bore of a gear the gear may roll down the periphery of said cutter from said position, removal chute means arranged below the top of said cutter in the path of and to receive gears that roll down the cutter periphery, and means whereby a component of force is applied to a gear upon retraction of said arbor in a direction to cause the gear to roll down said periphery to said chute means.

ALEXANDER D. F. MONCRIEFF.

References Cited in the file of this patent

UNITED STATES PATENTS

| Number | Name | Date |
|---|---|---|
| 835,525 | Hird | Nov. 13, 1906 |
| 1,008,429 | Osmer | Nov. 14, 1911 |
| 1,174,349 | Reynolds | Mar. 7, 1916 |
| 1,193,078 | Scott | Aug. 1, 1916 |
| 1,594,821 | Dulligan | Aug. 3, 1926 |
| 1,911,106 | Camerota | May 23, 1933 |
| 1,938,939 | Smith | Dec. 12, 1933 |
| 2,272,179 | Allardt | Feb. 10, 1942 |
| 2,353,480 | Marsilius | July 11, 1944 |
| 2,411,110 | Pruitt | Nov. 12, 1946 |
| 2,435,652 | Koehler | Feb. 10, 1948 |
| 2,479,878 | Strelzoff | Aug. 23, 1949 |
| 2,535,648 | Mills | Dec. 26, 1950 |